(12) United States Patent
Huang et al.

(10) Patent No.: US 8,366,309 B2
(45) Date of Patent: Feb. 5, 2013

(54) LIGHT GUIDE PLATE HAVING LATERAL OPTICAL STRUCTURES AND BACKLIGHT MODULE HAVING THE LIGHT GUIDE PLATE

(75) Inventors: Yen-Chang Huang, Hsin-Chu (TW); Kang-Chung Liu, Hsin-Chu (TW); Wen-Yuan Cheng, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 404 days.

(21) Appl. No.: 12/582,017

(22) Filed: Oct. 20, 2009

(65) Prior Publication Data

US 2010/0165658 A1 Jul. 1, 2010

(30) Foreign Application Priority Data

Dec. 25, 2008 (TW) ............................... 97150775 A

(51) Int. Cl.
*F21V 5/02* (2006.01)
*F21V 8/00* (2006.01)

(52) U.S. Cl. .................... 362/626; 362/618; 362/339

(58) Field of Classification Search ............ 362/615, 362/618, 26, 27, 626, 298, 339, 623; 659/833, 659/834; 359/833, 834
See application file for complete search history.

(56) References Cited

U.S. PATENT DOCUMENTS

| | | | | |
|---|---|---|---|---|
| 5,997,148 A * | 12/1999 | Ohkawa | | 362/619 |
| 6,139,163 A * | 10/2000 | Satoh et al. | | 362/612 |
| 7,628,527 B2 * | 12/2009 | Kim et al. | | 362/621 |
| 7,682,062 B2 * | 3/2010 | Stadtwald-Klenke | | 362/612 |
| 7,697,206 B2 * | 4/2010 | Kogure et al. | | 359/599 |
| 7,798,696 B2 * | 9/2010 | Lee et al. | | 362/612 |
| 7,806,538 B2 * | 10/2010 | Ajiki et al. | | 362/19 |
| 7,837,373 B2 * | 11/2010 | Chang | | 362/607 |
| 7,855,765 B2 * | 12/2010 | Takahashi et al. | | 349/65 |
| 2003/0030764 A1 | 2/2003 | Lee | | |
| 2004/0017675 A1 | 1/2004 | Yang | | |
| 2006/0164861 A1 * | 7/2006 | Maeda et al. | | 362/615 |

(Continued)

FOREIGN PATENT DOCUMENTS

| CN | 1560676 A | 1/2005 |
|---|---|---|
| CN | 1683964 A | 10/2005 |

(Continued)

OTHER PUBLICATIONS

CN Office Action mailed Jan. 22, 2010.

(Continued)

*Primary Examiner* — Peggy A. Neils
(74) *Attorney, Agent, or Firm* — McClure, Qualey & Rodack, LLP

(57) ABSTRACT

The present invention discloses a light guide plate and a backlight module having the same. The light guide plate includes a light emitting surface, a light incident surface, a light reflecting surface, and a plurality of prisms disposed on the light reflecting surface. The disposition direction of the prisms can be parallel or perpendicular to the lengthwise direction of the light reflecting surface. An inclined angle may exist between the disposition direction of the prisms and the lengthwise of the light reflecting surface. The backlight module includes a light guide plate, a light source, and an optical film set, wherein the light source is disposed near the light incident surface. The optical film set partially covers the light emitting surface, wherein a distance exists between a vertex of the prism and an edge of the optical film set.

13 Claims, 8 Drawing Sheets

U.S. PATENT DOCUMENTS

| | | |
|---|---|---|
| 2007/0080914 A1 | 4/2007 | Sun et al. |
| 2007/0145395 A1 | 6/2007 | Liu et al. |
| 2007/0195418 A1 | 8/2007 | Kogure et al. |
| 2008/0089092 A1 | 4/2008 | Lee et al. |
| 2008/0137374 A1 | 6/2008 | Kim et al. |

FOREIGN PATENT DOCUMENTS

| | | |
|---|---|---|
| CN | 101201149 A | 6/2008 |
| TW | 200608083 A | 3/2006 |
| TW | 200848809 A | 12/2008 |

OTHER PUBLICATIONS

English abstract of CN1560676A, pub. Jan. 5, 2005.
English abstract of CN1683964, pub. Oct. 19, 2005.
China Office Action dated Jun. 30, 2010.
Taiwan Office Action dated Mar. 21, 2012.
English translation of abstract of TW 200608083 A.
English translation of abstract of TW 200848809 A.

* cited by examiner

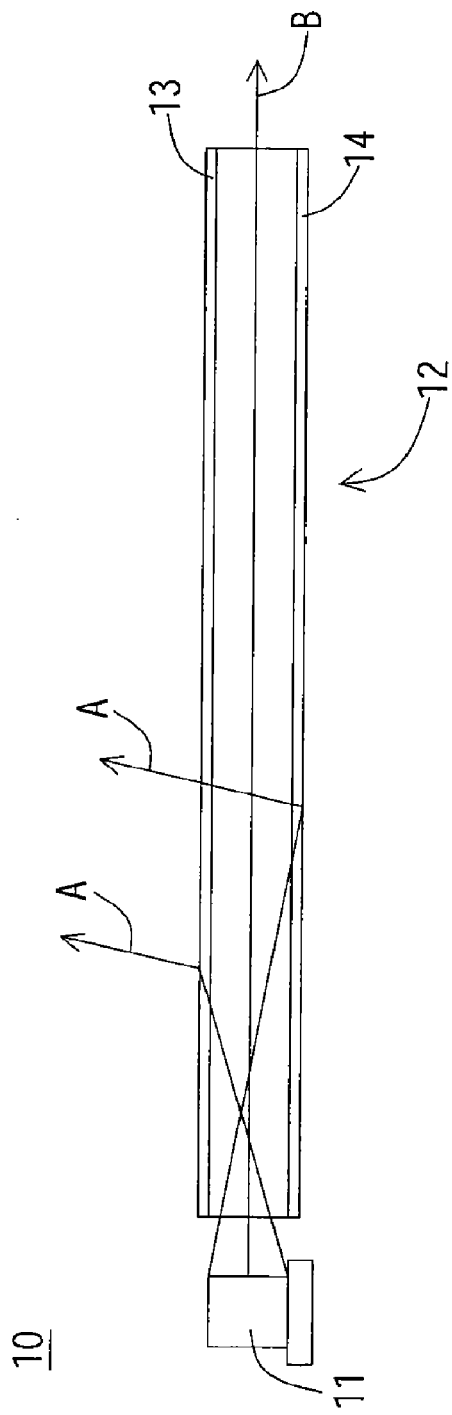
1B (PRIOR ART)

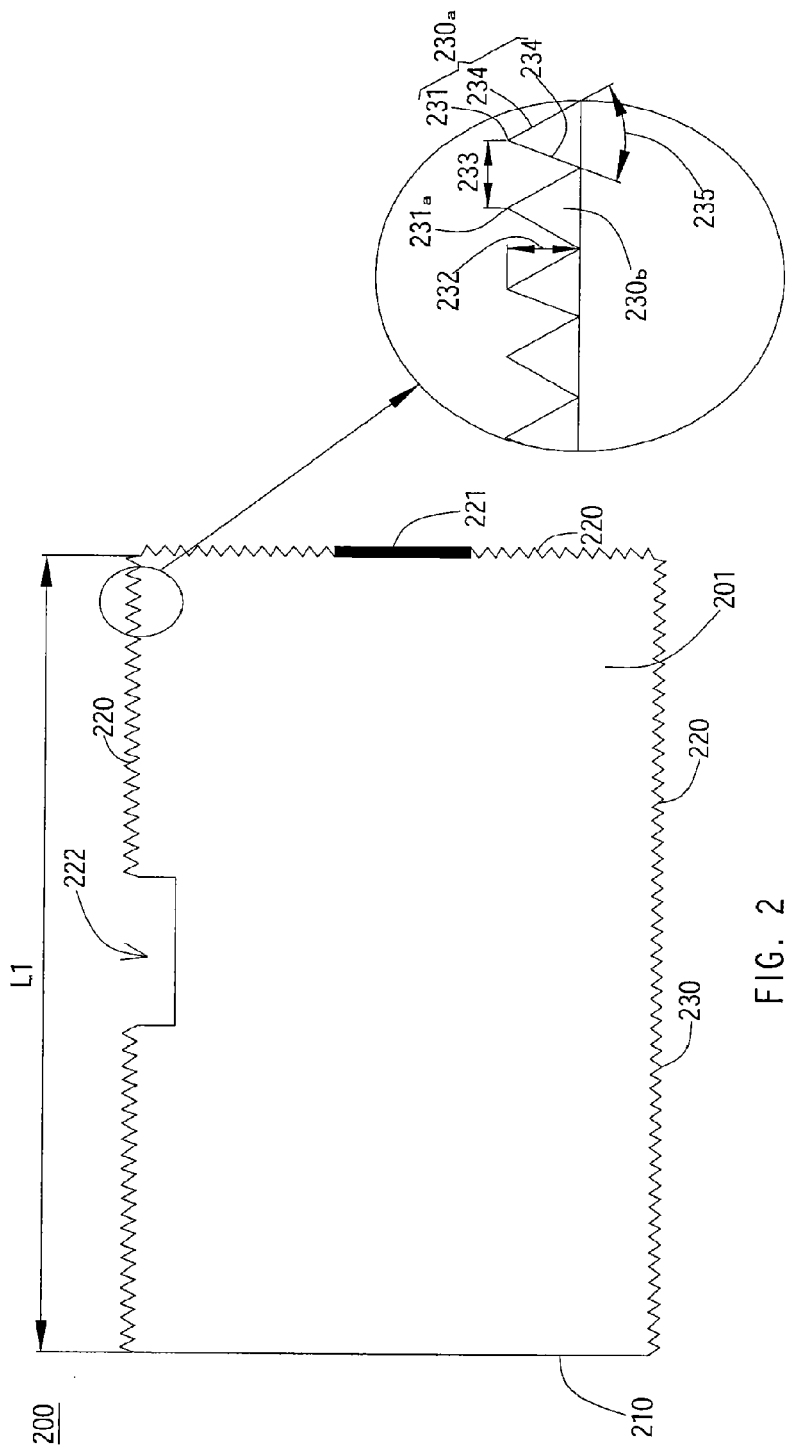
FIG. 2
FIG. 4
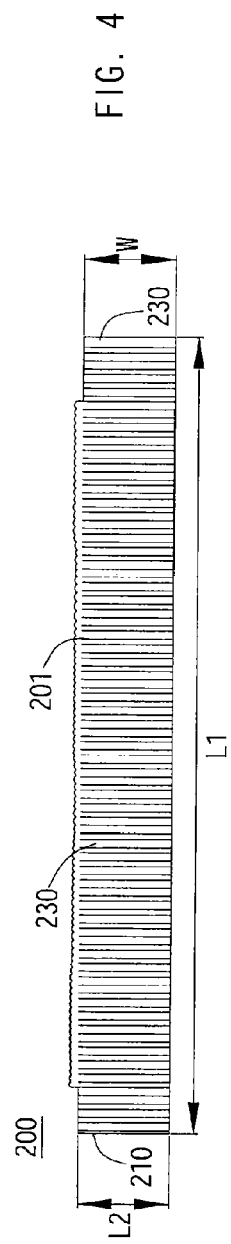
FIG. 3

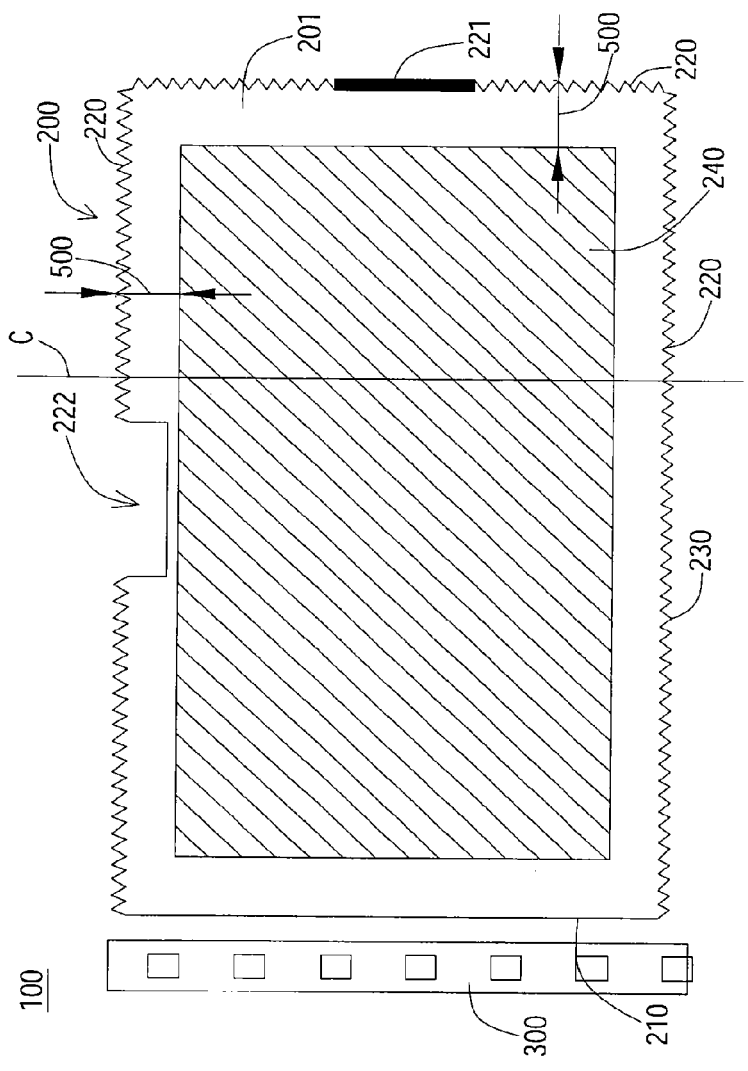
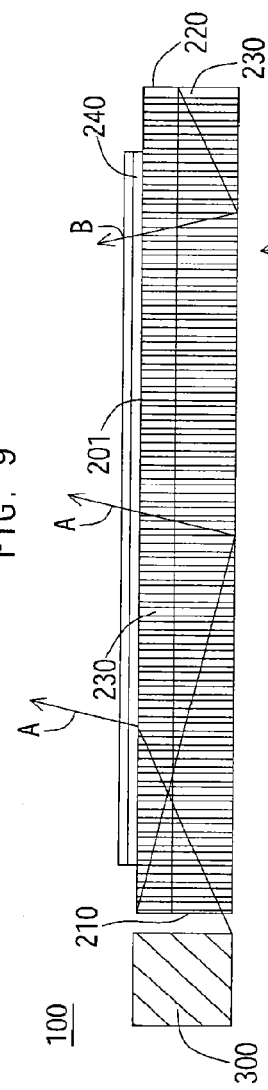
FIG. 9
FIG. 10

LIGHT GUIDE PLATE HAVING LATERAL OPTICAL STRUCTURES AND BACKLIGHT MODULE HAVING THE LIGHT GUIDE PLATE

BACKGROUND OF THE INVENTION

1. Field of the Invention

This invention relates to a light guide plate and a backlight module having the same and specifically relates to a light guide plate with prisms disposed on its lateral sides and a backlight module having the same.

2. Description of the Prior Art

Backlight module, as an essential element of the liquid crystal display (LCD), is used to provide adequate and uniform luminance for the LCD panel to properly display images. Especially after the LCDs have become the mainstream flat display devices, the luminance efficiency of the backlight module becomes an important factor affecting the overall performance of the LCDs.

FIG. 1A and FIG. 1B are a top view and a side view of a conventional backlight module 10, wherein a light source 11 is disposed next to one side of the light guide plate 12. As FIG. 1B shows, the light source 11 emits light toward the light guide plate 12, wherein the light includes at least light A and light B. The light guide plate 12 of the conventional backlight module 10 further includes a first optical layer 13 and a second optical layer 14 for allowing light A to exit from the top surface of the light guide plate 12 to form a planar light.

However, for the conventional backlight module 10 illustrated in FIG. 1A and in FIG. 1B, there is still light B not processed by the first optical layer 13 or the second optical layer 14. Light B then exits from the lateral side of the light guide plate 12 resulting in a loss of luminance and a waste of light energy.

SUMMARY OF THE INVENTION

It is an object of the present invention to provide a light guide plate with prisms on lateral sides for reflecting light at the edge back to the light guide plate.

It is another object of the present invention to provide a backlight module having the light guide plate to recover light at the edge and improve the overall luminance.

The light guide plate of the present invention includes a light emitting surface, a light incident surface, and a light reflecting surface, wherein a plurality of prisms are disposed on the light reflecting surface. The prisms reflect light at the light reflecting surface back to the light guide plate allowing the light to eventually exit from the light emitting surface. The prisms can be disposed perpendicular or parallel to the lengthwise direction of the light reflecting surface, but is not limited thereto. In a different embodiment, an inclined angle exists between the disposition direction of the prisms and the longwise direction of the light reflecting surface, wherein the inclined angle is substantially between 30° and 60°.

The light guide plate further includes a protrusion area or a recess area. The protrusion area or the recess area is used to be engaged with a frame to form a backlight module. A ratio of the length of the protrusion area or the recess area to that of the light reflecting surface is substantially between 3% and 25%. Furthermore, the prism can be selectively disposed within the protrusion area or the recess area according to the required incident angle and light intensity or other design requirements.

The backlight module of the present invention includes a light source, the above mentioned light guide plate, and an optical film set. The light source is disposed near the light incident surface and emits light toward the light incident surface, wherein the light travels within the light guide plate and eventually exits from the light emitting surface by reflections within the light guide plate. The optical film set is disposed on the light emitting surface and covers at least part of the light emitting surface for accepting and processing light from the light emitting surface in order to form a planar light.

BRIEF DESCRIPTION OF THE DRAWINGS

FIG. 1A and FIG. 1B are a top view and a side view of a conventional backlight module;

FIG. 2 is a top view of the light guide plate of one embodiment of the present invention;

FIG. 3 illustrates a side view of the light guide plate in FIG. 2;

FIG. 4 is an enlarged view of the prisms illustrated in FIG. 2;

FIG. 9 is a top view of the backlight module of the present invention, wherein a light source and a light incident surface are disposed on the lateral side of the light guide plate;

FIG. 10 is a side view of the backlight module illustrated in FIG. 9;

DETAILED DESCRIPTION OF THE PREFERRED EMBODIMENT

Figure 1A:
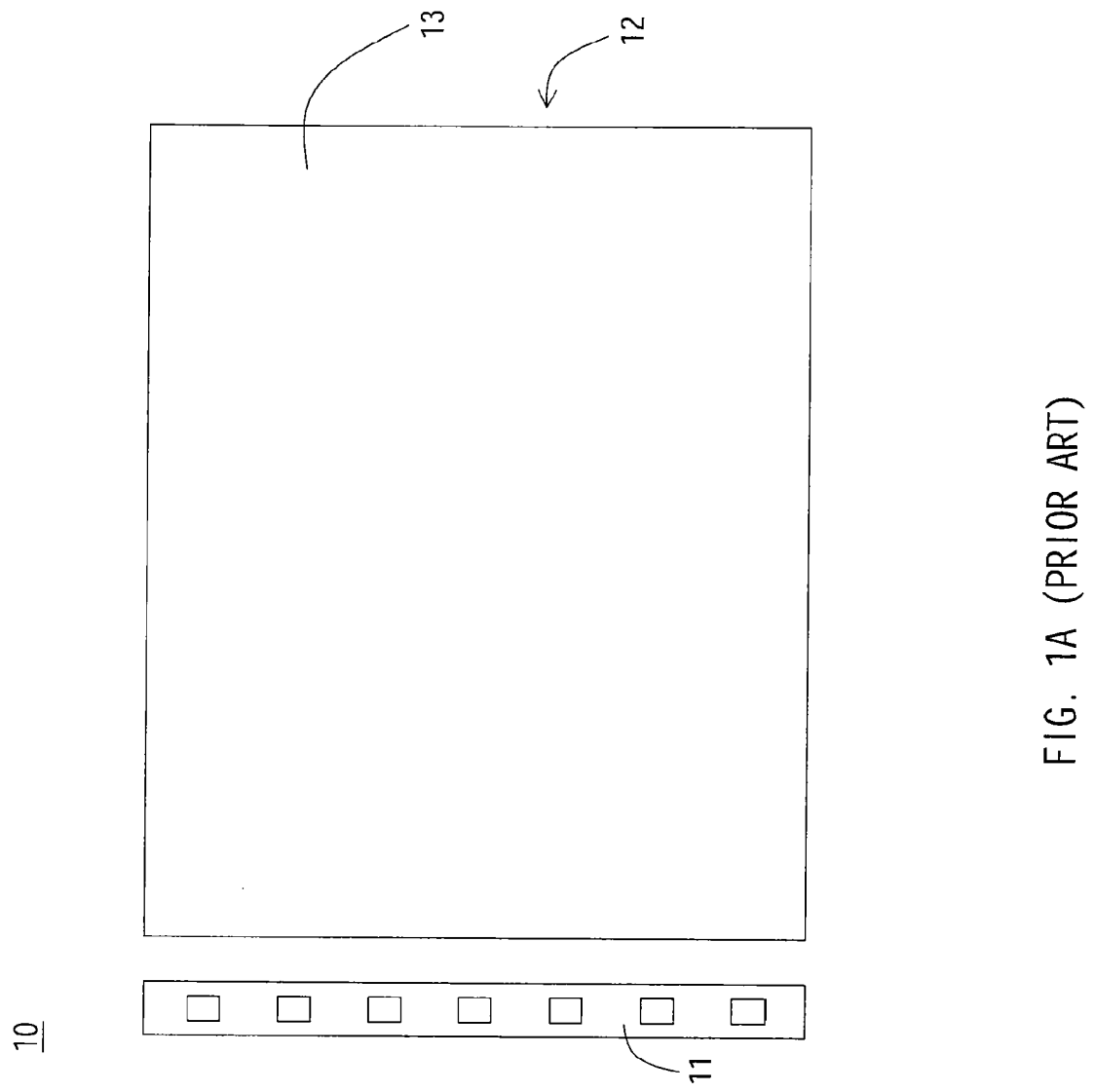

The present invention provides a light guide plate and a backlight module having the same, preferably for liquid crystal displays (LCDs). A plurality of prisms are disposed on at least one lateral side of the light guide plate to reflect light emitted from a light source and improve the luminance efficiency of the backlight module. Furthermore, the backlight module in the embodiments described below is an edge-lighting backlight module, but is not limited thereto. In different embodiments, the backlight module of the present invention can be a bottom-lighting backlight module.

FIG. 2 is a top view of the light guide plate 200 of one embodiment of the present invention, wherein the light guide plate 200 is preferably rectangular, but is not limited thereto. In different embodiments, the light guide plate 200 has a square shape or other suitable shape. As shown in FIG. 2, the light guide plate 200 includes a light emitting surface 201, a light incident surface 210, and a plurality of light reflecting surfaces 220, wherein the light emitting surface 201 is connected to the light incident surface 210 and the light reflecting surfaces 220 and substantially perpendicular to the light incident surface 210 and the light reflecting surfaces 220, but is not limited thereto. In the present embodiment, the light guide plate 200 is used in an edge-lighting backlight module, wherein a light source (not illustrated) is disposed near the light incident surface 210 and emits light toward the light incident surface 210 into the light guide plate 200. Light is then reflected within the light guide plate 200 and emits from the light emitting surface 201.

As shown in FIG. 2, a plurality of prisms 230 are disposed on at least part of the light reflecting surfaces 220 of the light guide plate 200. The prisms 230 are used to reflect the light toward the light reflecting surfaces 220 so that the light can be reflected back into an inner part of the light guide plate 200 and eventually emits from the light emitting surface 201. In the present embodiment, prisms 230 are distributed on the surfaces of the light reflecting surfaces 220 (i.e. the other lateral sides of the light guide plate 200). The ratio of a length of the light reflecting surfaces 220 which is disposed with the prisms 230 to the total length of the light incident surface 210 and the light reflecting surfaces 220 (i.e. the perimeter of the light guide plate 200) ranges from 10% to 95%. In the present embodiment, the light incident surface 210 is preferably a plane surface, but is not limited thereto; in different embodiments, the light incident surface 210 can be disposed with optical micro-structures similar to the prisms 230.

In the embodiment illustrated in FIG. 2, the light guide plate 200 further includes a material injection end 221 formed on part of one of the light reflecting surface 220 between adjacent prisms 230. In the present embodiment, the light guide plate 200 is made of plastic material and preferably made by the injection molding process. In other words, the material injection end 221 is formed after the material of the light guide plate 200 is injected, solidified, and separated from the mold. That is, the material injection end 221 is where the injection port locates during the injection molding process. In the present embodiment, the material injection end 221 is formed on the shorter side of the light guide plate 200, but is not limited thereto. In different embodiments, depending on the manufacture process, the material injection end 221 can be formed on other sides of the light guide plate 200. Furthermore, in the present embodiment, the length of the material injection end 221 is preferably 30 mm, but is not limited thereto; in different embodiments, the length of the material injection end 221 can be changed according to the size of the light guide plate 200, the size of the injection port, or other design factors.

In order to position the light guide plate 200, a protrusion area or a recess area can be formed on the edge of the light guide plate 200. However, only the recess area will be discussed hereinafter since the protrusion area has a similar effect. As shown in FIG. 2, a recess area 222 is formed on one of the light reflecting surface 220, wherein the recess area 222 is engaged with a fixing end of a frame (not shown) in order to couple the light guide plate 200 to the frame to form the backlight module. In this embodiment, the length of the recess area 222 parallel to the length L1 of the light reflecting surface 220 is substantially 25% of the length L1 of the light reflecting surface 220, but is not limited thereto. In different embodiments, the ratio of the length of the recess area 222 to the length L1 of the light reflecting surface 220 can be other values. However, the above-mentioned ratio is preferably greater than 3% or between 3% and 25%. Furthermore, the prisms 230 of the present invention can be selectively disposed in at least part of the recess area 222. In the embodiment illustrated in FIG. 2, when the ratio of the length of the recess area 222 to the length L1 of the light reflecting surface 220 is less than 3%, the prisms 230 are generally not disposed within the recess area 222, but are not limited thereto. In different embodiments, when the ratio of the length of the recess area 222 to the length L1 of the light reflecting surface 220 is substantially greater than 3% or between 3% and 25%, the prisms 230 can be disposed within the recess area 222 (on the width parts or the length part of the recess area 222) according to the light incident angle and light intensity or other design requirements. Furthermore, the disposition direction of the prisms 230 within the recess area 222 can be identical to that on the light reflecting surface 220, but is not limited thereto. In different embodiments, the disposition direction of the prisms 230 within the recess area 222 can be perpendicular to or intersected at an angle with that of the prisms 230 on the light reflecting surface 220.

FIG. 3 illustrates a side view of the light guide plate in FIG. 2. As shown in FIG. 3, the prisms 230 are disposed on the light reflecting surfaces 220 and the prisms 230 of the present embodiment are straight prisms or linear prisms. Furthermore, the disposition direction of the prisms 230 are substantially perpendicular to the lengthwise direction of the light reflecting surfaces 220, but is not limited thereto. The prisms 230 can have different disposition direction by disposing on the light reflecting surfaces 220 in different orientation. The upper or bottom light reflecting surface 220 has a length L1 and a width W, wherein the prism 230 has a prism length L2. In the present embodiment, the disposition direction of the prism 230 is perpendicular of the lengthwise direction of the upper or bottom light reflecting surface 220 and thus the prism length L2 is substantially equal to the width W, but is not limited thereto. In different embodiments, the prism length L2 can differ based on the disposition direction of the prisms or other design factors.

Furthermore, as shown in FIG. 3, the light emitting surface 201 has an irregular surface, wherein a plurality of hemispheres are disposed on the light emitting surface 201. The hemispheres on the light emitting surface 201 are used to accept and divert or process light to form a planar light, which covers a relatively larger area. In the present embodiment, the light emitting surface 201 is disposed with hemispheres, but is not limited thereto. In different embodiments, the light emitting surface 201 can be disposed with prisms, cones, or other objects which can be used to accept and process or divert light to form the planar light.

FIG. 4 is an enlarged view of the prisms illustrated in FIG. 2. As shown in FIG. 4, the light guide plate 200 includes a first prism 230a and a second prism 230b, wherein the first prism 230a and the second prism 230b are preferably linear prisms, but are not limited thereto. In the present embodiment, the first prism 230a and the second prism 230b are identical in shape and size, but are not limited thereto. The prism height 232 of the first prism 230a and the second prism 230b is preferably 100 μm, but is not limited thereto. In different embodiments, the prism height 232 can be adjusted according to the size of the light guide plate 200, the arrangement of the light incident surface 210, the lengths L and the widths W of the light reflecting surfaces 220. However, the average prism height 232 of the prisms 230 is substantially between 1 μm and 4000 μm. Furthermore, as shown in FIG. 4, the first prism 230a further includes two inclined surfaces 234, wherein a first angle (e.g. vertex angle) 235 exists between the two inclined surfaces 234. In the present embodiment, the first angle 235 is preferably 90°, but is not limited thereto. In different embodiments, the first angle 235 can be adjusted according to the size of the light guide plate 200, the prism height 232 of the first prism 230a, or other design factors. However, the average first angle 235 is substantially between 70° and 110°.

Furthermore, as shown in FIG. 4, the first prism 230a and the second prism 230b respectively includes a first vertex 231 and a second vertex 231a, wherein a gap 233 exists between the first vertex 231 and the second vertex 231a. The gap 233 can be adjusted by changing the prism height 232 or the first angle 235 of the first prism 230a and the second prism 230b. However, the gap 233 is preferably between 24 μm and 1000 μm.

Figure 5:
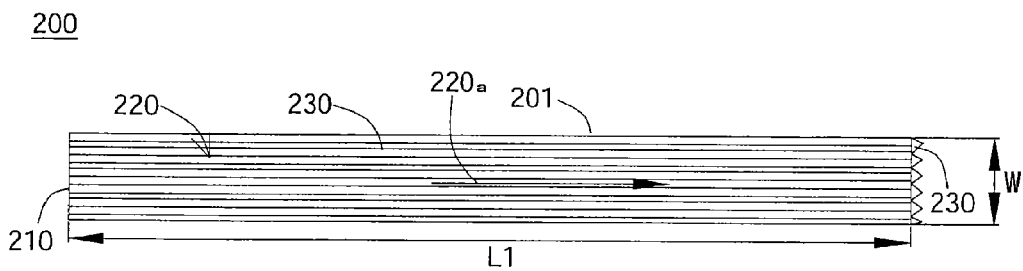
FIG. 5 is a side view illustrating a modification of the light guide plate of the present invention, wherein the disposition direction of the prisms is parallel to the lengthwise direction of the light reflecting surface.
Figure 6:
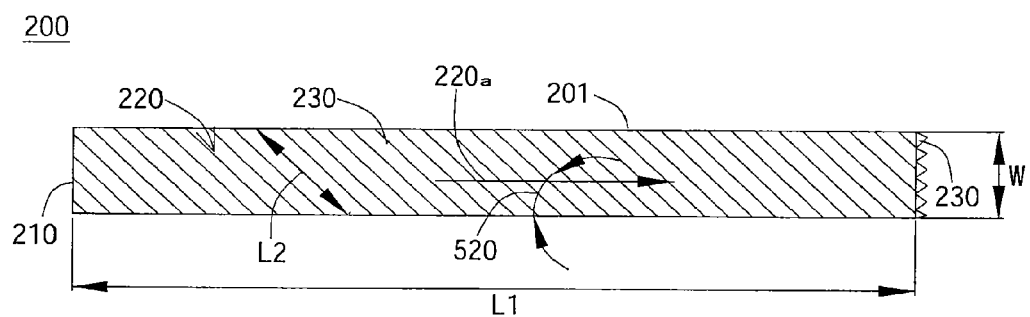
FIG. 6 is a side view illustrating another modification of the light guide plate of the present invention, wherein an inclined angle exists between the disposition direction of the prisms and the lengthwise direction of the light reflecting surface.

FIG. 5 and FIG. 6 are side views illustrating modifications of the light guide plate 200 of the present invention. In the embodiment illustrated in FIG. 5, the disposition direction of the prisms 230 is substantially parallel to the lengthwise direction 220a of the light reflecting surface 220. In the embodiment illustrated in FIG. 6, an inclined angle 520 exists between the disposition direction of the prisms 230 and the lengthwise direction 220a of the light reflecting surface 220. In the present embodiment, the inclined angle 520 is preferably 45°, but is not limited thereto. In different embodiments, the inclined angle 520 can be adjusted by changing the disposition direction of the prisms 230. However, the inclined angle 520 of the present embodiment is substantially between 30° and 60°. As shown in FIG. 6, the prisms 230 have different lengths L2. For instance, the prisms 230 close to the light incident surface 210 and to the light reflecting surface 220 opposite to the light incident surface 210 will be shorter, but is not limited thereto. In other words, the prisms 230 close to the corners of the light guide plate 200 will be shorter. In different embodiments, the length L2 will be equal to or greater than the width W of the light reflecting surface 220 and equal to or smaller than $[(L1)^2+W^2]^{1/2}$, wherein L1 is the length of the light reflecting surface 220. In other words, the length L2 of the prism 230 is preferably equal to or smaller than that of the diagonal of the light reflecting surface 220.

Figure 7:
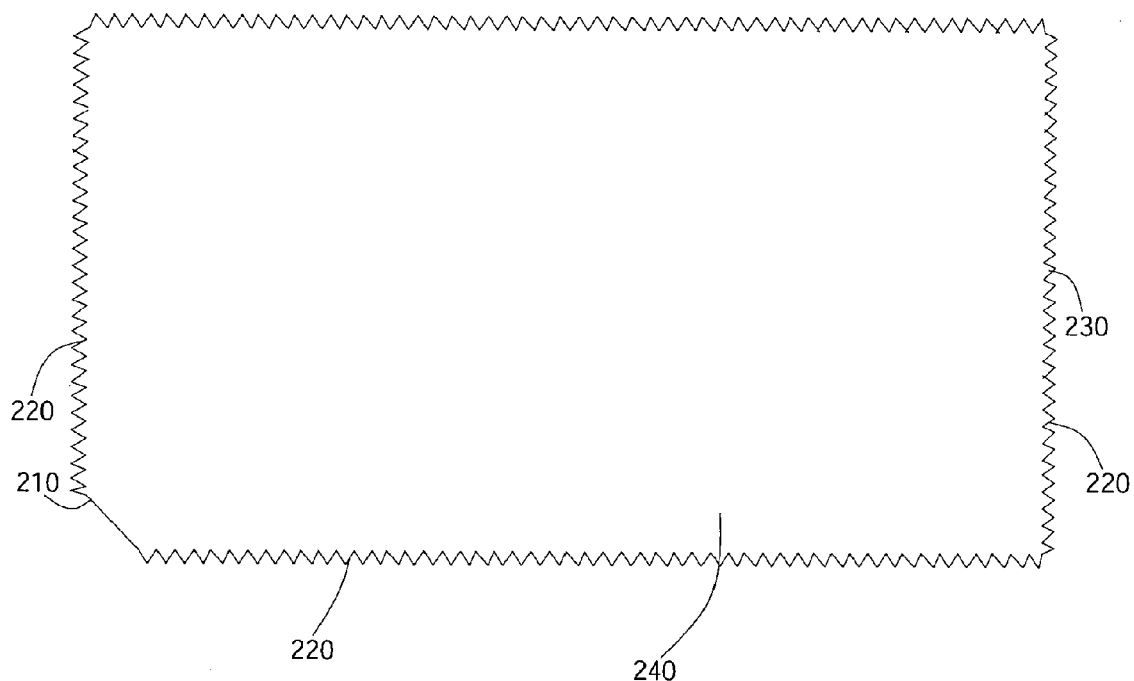
FIG. 7 and FIG. 8 illustrate modifications of the light guide plate of the present invention.
Figure 8:
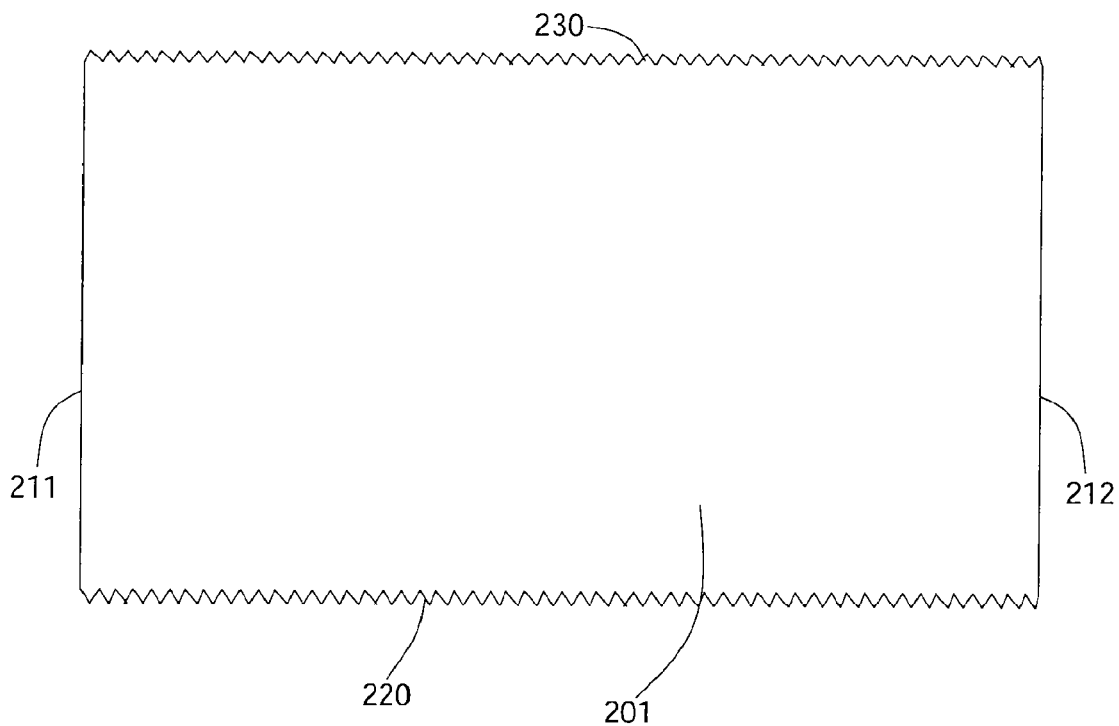

FIG. 7 and FIG. 8 illustrate modifications of the light guide plate of the present invention. As shown in FIG. 7, the light incident surface 210 is formed on one corner of the light guide plate 200. In the present embodiment, the light incident surface 210 is formed on the bottom-left corner of the light guide plate 200, but is not limited thereto. The light reflecting surfaces 220 having the prisms 230 includes two lateral sides of the light guide plate 200 connected to the light incident surface 210, i.e. the bottom and left sides of the light guide plate 200. Furthermore, the upper and right sides of the light guide plate 200 can also be provided with the prisms 230, but are not limited thereto. The light guide plate 200 illustrated in FIG. 7 is preferably used in a backlight module with light emitting diodes as the light source, but is not limited thereto. In the embodiment illustrated in FIG. 8, the light guide plate 200 includes a first light incident surface 211 and a second light incident surface 212 located on two opposite sides of the light guide plate 200, i.e. the left and right sides of the light guide plate 200 in FIG. 8. The light reflecting surfaces 220 having prisms 230 are connected to the first light incident surface 211 and the second light incident surface 212, i.e. the upper and bottom sides of the light guide plate 200 in FIG. 8. The light guide plate 200 in FIG. 8 is preferably incorporated with a light emitting diode (LED) light bar or cold cathode fluorescent lamp (CCFL) in a backlight module, wherein the backlight module can include two CCFLs or two LED light bars to be correspondingly disposed near the first light incident surface 211 and the second light incident surface 212.

FIG. 9 is a top view of the backlight module 100 of the present invention, wherein the backlight module 100 includes the light guide plate 200 illustrated in FIG. 2, a light source 300, and an optical film set 240. As FIG. 9 shows, the light source 300 is disposed corresponding to the light incident surface 210 and emits light into the light incident surface 210. Light traveling within the light guide plate 200 is reflected or refracted by the light guide plate 200. Eventually the reflected or refracted light exits from the light emitting surface 201 toward the upper optical film set 240. The optical film set 240 is disposed on the light emitting surface 201 and at least partially covers the light emitting surface 201. The optical film set 240 is used to accept light emitted from the light emitting surface 201 and process the light to change the characteristics of light. The optical film set 240 includes a light diffuser film and a prism film, wherein the light diffuser film is used to process and scatter light in order to uniformly distribute the light emitted from the light emitting surface 201. The prism film is used to alter the traveling direction of the light allowing the light to be emitted from the optical film set 240 in a direction perpendicular to the light emitting surface 201.

FIG. 10 is a side view of the backlight module 100 illustrated in FIG. 9, wherein the optical film set 240 is disposed on the light guide plate 200 covering part of the light emitting surface 201. In the embodiment illustrated in FIG. 10, the light source 300 emits light A and light B toward the light incident surface 210, wherein light A travels toward the bottom of the light guide plate 200 or the light emitting surface 201. As shown in FIG. 10, light A is reflected and structurally broken to form a planar light which exits through the light emitting surface 201. The traveling direction of Light B in FIG. 10 is substantially parallel to the light emitting surface 201 and toward the right light reflecting surface 220 opposite to the light incident surface 210. Afterward light B will be reflected toward the bottom of the light guide plate 200, processed with the light guide plate 200, and then exits from the light emitting surface 201. Similarly, the light reflecting surfaces 220 at the upper and bottom sides of the light guide plate 200 are also disposed with the prisms 230, as shown in FIG. 9. Thus the two light reflecting surfaces 220 process light B in the same way described above and will not be elaborated here again. Thus it can be seen that the prisms 230 recover the light conventionally exiting from lateral sides of the light guide plate 200. In this way, the prisms 230 reduce the waste of light energy and further enhance the overall luminance of the backlight module 100.

Figure 11:
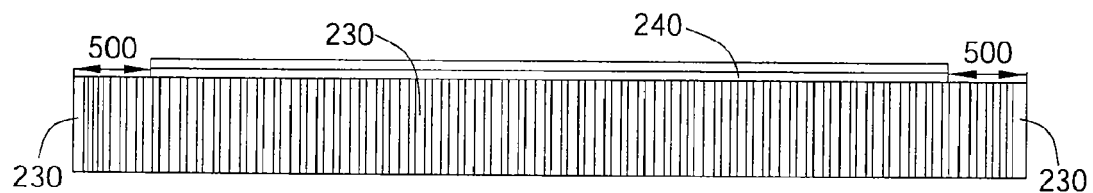
FIG. 11 is a cross-sectional view of the backlight module illustrated in FIG. 9, wherein the backlight module further includes an optical film set.

FIG. 11 is a cross-sectional view of the backlight module 100 obtained by cutting the light guide plate 200 in FIG. 9 along line C. As shown in FIG. 9 and FIG. 11, a distance 500 exists between the vertex of the prism 230 and the edge of the optical film set 240, wherein the distance 500 is preferably greater than the average height of the prisms 230. In other words, the optical film set 240 and the prisms 230 are not overlapped and the distance 500 is substantially between 1 μm and 1000 μm, i.e. between 0.01 mm and 10 mm.

Figure 12:
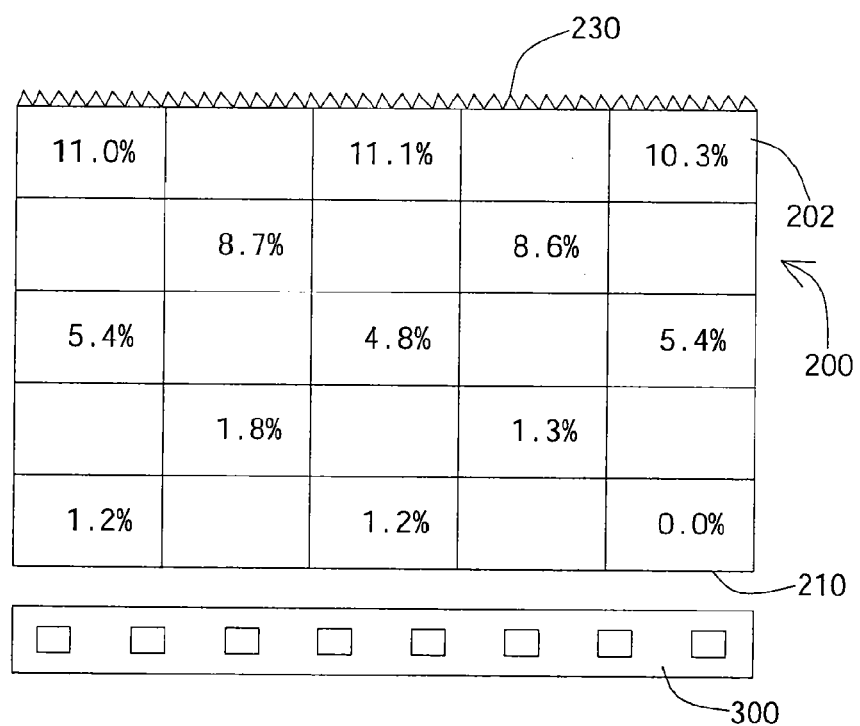
FIG. 12 illustrates the luminance distribution of the backlight module.

FIG. 12 illustrates the luminance distribution of the backlight module under the effect of prisms 230, wherein the backlight module includes a light guide plate 200, a light source 300, and prisms 230. In the present embodiment, the light source 300 is disposed corresponding to one side of the light guide plate 200, i.e. the bottom side of the light guide plate 200 in FIG. 12, while the prisms 230 are disposed on the side opposite to the light source 300. As shown in FIG. 12, the light guide plate 200 is divided into 25 light guide plate portions 202. Luminance for each light guide plate portions 202 is compared with a comparison luminance to obtain a luminance ratio. The above-mentioned comparison luminance is the luminance of the light guide plate 202 without the prisms 230 provided on the light guide plate 200. In other words, the light guide plate portion 202 with luminance ratio of 110% outputs 10% more of luminance than the same light guide plate portion 202 without the prisms 230. In order to better understand the effect of the prisms 230, the ratio in FIG. 12 is obtained by subtracting the corresponding comparison luminance (100%) from the luminance ratio. For instance, as it can be seen from FIG. 12, the upper side of the backlight module having prisms thereon has produced approximately 11% more of luminance than the backlight module without prisms.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A backlight module, comprising:
   a light guide plate including a light emitting surface, a light incident surface, at least one light reflecting surface opposite to the light incident surface, and a plurality of prisms disposed on the light reflecting surface to reflect lights passing through the light incident surface, wherein the light incident surface and the light reflecting surface are connected to the light emitting surface, wherein the light guide plate further includes a recess area or a protrusion area formed on the light reflecting surface, wherein at least part of the prisms are disposed in the recess area or the protrusion area;
   a light source disposed corresponding to the light incident surface; and
   an optical film set partly covering the light emitting surface, wherein a distance exists between a vertex of the prism and an edge of the optical film set.

2. The backlight module of claim 1, wherein an average height of the prisms ranges from 1 micrometer to 4000 micrometers.

3. The backlight module of claim 1, wherein the distance is greater than an average height of the prisms.

4. The backlight module of claim 1, wherein the distance ranges from 0.01 millimeter to 10 millimeters.

5. The backlight module of claim 1, wherein a gap between the vertices of the adjacent prisms ranges from 24 micrometers to 1000 micrometers.

6. The backlight module of claim 1, wherein the light guide plate further includes a material injection end formed on the light reflecting surface.

7. The backlight module of claim 1, wherein a ratio of a length of the recess area or the protrusion area to a length of the light reflecting surface ranges from 3% to 25%.

8. The backlight module of claim 1, wherein a ratio of a length of the light reflecting surface disposed with the prisms to a total length of the light incident surface and the light reflecting surface ranges from 10% to 95%.

9. The backlight module of claim 1, wherein a disposition direction of the prisms is parallel to a lengthwise direction of the light reflecting surface.

10. The backlight module of claim 1, wherein a disposition direction of the prisms is perpendicular to a lengthwise direction of the light reflecting surface.

11. The backlight module of claim 1, wherein an inclined angle between a disposition direction of the prisms and a lengthwise direction of the light reflecting surface ranges from 30° to 60°.

12. The backlight module of claim 1, wherein a vertex angle of the prisms ranges from 70° to 110°.

13. A backlight module, comprising:
   a light guide plate including a light emitting surface, a light incident surface, a first light reflecting surface opposite to the light incident surface, a second light reflecting surface adjacent to the light emitting surface, the light incident surface and the first light reflecting surface, and a plurality of prisms disposed on the second light reflecting surface, wherein the area of the light emitting surface is larger than the area of the light incident surface;
   a light source disposed corresponding to the light incident surface; and an optical film set partly covering the light emitting surface, wherein the light guide plate further includes a recess area or a protrusion area formed on the second light reflecting surface; wherein at least part of the prisms are disposed in the recess area or the protrusion area.

* * * * *